(12) United States Patent
Sun et al.

(10) Patent No.: US 10,579,838 B2
(45) Date of Patent: Mar. 3, 2020

(54) INTEGRATED CARD SWIPING DEVICE (71) Applicant: PAX COMPUTER TECHNOLOGY (SHENZHEN) CO., LTD., Shenzhen, Guangdong (CN)

(72) Inventors: Xiaojin Sun, Guangdong (CN); Xiaojun Huang, Guangdong (CN)

(73) Assignee: PAX COMPUTER TECHNOLOGY (SHENZHEN) CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/744,121

(22) PCT Filed: Jul. 31, 2017

(86) PCT No.: PCT/CN2017/095268
§ 371 (c)(1),
(2) Date: Jan. 12, 2018

(87) PCT Pub. No.: WO2019/000550
PCT Pub. Date: Jan. 3, 2019

(65) Prior Publication Data
US 2019/0005278 A1    Jan. 3, 2019

(30) Foreign Application Priority Data
Jun. 30, 2017 (CN) .................... 2017 2 0789072 U (51) Int. Cl.
*G06K 7/08* (2006.01)
*G06K 7/00* (2006.01)

(52) U.S. Cl.
CPC ........... *G06K 7/087* (2013.01); *G06K 7/0021* (2013.01); *G06K 7/084* (2013.01)

(58) Field of Classification Search
USPC ....................................................... 235/449
See application file for complete search history.

(56) References Cited

U.S. PATENT DOCUMENTS

2009/0108061 A1* 4/2009 Tartavull .............. G06K 7/0004
235/380
2013/0026218 A1* 1/2013 Miller .................. G06K 7/0004
235/375

* cited by examiner

*Primary Examiner* — Rafferty D Kelly
(74) *Attorney, Agent, or Firm* — Rankin, Hill & Clark LLP (57) ABSTRACT

The present application provides an integrated card swiping device, which includes: a casing, a circuit board, a magnetic head, a card reader, and a card support for positioning a card. The card support defines therein a card slot for allowing the card to be inserted in, the card support is mounted inside the casing, the magnetic head is electrically connected with the circuit board, the card reader is mounted on the card support, the magnetic head is disposed on the card support, and a side of the casing defines a first opening for allowing the card to be inserted into the card slot.

17 Claims, 6 Drawing Sheets

INTEGRATED CARD SWIPING DEVICE

TECHNICAL FIELD

The present application relates to the technical field of point of sale (POS) machines, and more particularly, to an integrated card swiping device.

BACKGROUND

Cards, such as bankcards and credit cards, are often used during consumption. The present cards include magnetic stripe cards and chip cards; it requires to use a POS machine with a magnetic head to swipe the magnetic strip cards and to use a POS machine with a card reader to swipe the chip cards. The present POS machine with the magnetic head generally has an elongated card swiping slot arranged at a lateral side of the housing, and a magnetic stripe of a magnetic stripe card is swiped through the card swiping slot to enable the magnetic head to read information of the magnetic stripe card; while the POS machine with the card reader generally has a card insertion slot arranged at a bottom of the housing, and the a chip card is inserted into the card insertion slot such that information in the chip card is read by the card reader in the housing. In the present POS machine that integrates the magnetic stripe and the card reader, the lateral side of the POS machine is generally provided with the elongated card swiping slot, and meanwhile the bottom of the housing is provided with the card insertion slot. However, the POS machine of such a structure is bulky, inconvenient to be carried and used.

SUMMARY

It is an object of the present application to provide an integrated card swiping device, so as to solve problems in the prior art that a POS machine is of large volume and inconvenient in carrying and use.

In order to achieve the object, the present application adopts the following technical solution: an integrated card swiping device is provided, the integrated card swiping device comprises a casing; wherein, the integrated card swiping device further a circuit board mounted inside the housing, a magnetic head configured to read a magnetic strip card, a card reader configured to read a chip card, and a card support for positioning a card. The card support defines therein a card slot for allowing the card to be inserted in, the card support is mounted inside the casing, the magnetic head is electrically connected with the circuit board, the card reader is mounted on the card support, the magnetic head is disposed on the card support, and a side of the casing defines a first opening for allowing the card to be inserted into the card slot.

Further, the integrated card swiping device further comprises a positioning head for positioning the card, wherein the positioning head defines therein with a slit for guiding and positioning the card, and a rear end of the positioning head is fixed in the first opening.

Further, the card support extends from a front section of the card slot to form a support plate, and the magnetic head is disposed on the support plate.

Further, the magnetic head and the support plate extend into the positioning head, and the magnetic head is located at one side of the positioning head.

Further, the positioning head defines a notch, and the notch and the magnetic head are respectively located at two sides of the positioning head.

Further, the integrated card swiping device further comprises a resilient piece for supporting the magnetic head, one end of the resilient piece is fixed on the circuit board, and the magnetic head is mounted on another end of the resilient piece.

Further, the integrated card swiping device further comprises a flexible circuit board electrically connecting the magnetic head with the circuit board.

Further, the casing comprises a bottom cover and an upper cover arranged onto the bottom cover, the card support is mounted to the circuit board, and the circuit board is fixed to the bottom cover.

Further, the integrated card swiping device further comprises a display screen, and the display screen is mounted on a top side of the casing.

Further, the integrated card swiping device further comprises a wireless module for wireless communication, and the wireless module is electrically connected with the circuit board.

The integrated card swiping device of the present application has at least the following advantages: compared with the prior art, the present application is convenient for the insertion of the card into the card slot by defining the card slot on the card support. By disposing magnetic head on the card support and mounting the card reader on the card support, when the chip card is inserted into the card slot, the information of the chip card can be read by the card reader; when the magnetic strip card is inserted into the card slot, the information of the magnetic strip card can be read by the magnetic head. Thus, the reading structure for the magnetic strip card and the reading structure for the chip card are integrated as a whole, which reduces the occupied space, and the integrated card swiping device can be fabricated to be much smaller, moreover, in use, it is not necessary to distinguish whether the card is a magnetic strip card or a chip card, making the use convenient.

BRIEF DESCRIPTION OF THE DRAWINGS

In order to more clearly illustrate the technical solution in embodiments of the present application, the following drawings, which are to be used in the description of the embodiments or the prior art, will be briefly described. It will be apparent that the drawings described in the following description are merely some embodiments of the present application. Other drawings may be obtained by those skilled in the art without paying creative labor.

In the figures, the following numeral references are used:
50: Integrated card swiping device; 51: Casing; 511: Upper cover; 512: Bottom cover; 52: Positioning head; 521: Slit; 522: Notch; 523: Guide slot; 53: Circuit board; 531:

Gold finger; 532: Data interface; 54: Card support; 541: Card slot; 542: Support plate; 543: Ribs; 55: Card reader; 561: Resilient piece; 56: Magnetic head; 562: Flexible circuit board; and 58: Display screen.

DETAILED DESCRIPTION OF THE EMBODIMENTS

In order to make the technical problems to be solved, the technical solutions, and advantages of the present application more clear, the present application will be further described in detail with reference to the accompanying drawings and embodiments. It should be understood that the embodiments described herein are only used to explain the present invention but are not intended to limit the present application.

It should be noted that when an element is referred to as being "fixed" or "arranged" on another element, it can be directly on another element or be indirectly on another element. When an element is referred to as being "connected" to another element, it can be directly connected to another element or indirectly connected to another element.

In the description of the present application, it should be understood that terms "length", "width", "thickness", "above", "beneath", "front", "rear", "left", "right", "vertical", "horizontal", "top", "bottom", "inner"", and the like are based on the orientation or the positional relationship shown in the drawings, which is for the convenience of describing the present application and the simplified description, rather than indicating or implying that the device or element referred to must have a particular orientation or be constructed and operated in the particular orientation, and therefore these orientation or positional relationship should not be explained as limiting the present invention.

In addition, terms like "first" and "second" are only used for the purpose of description, and will in no way be interpreted as indication or hint of relative importance or implicitly indicate the number of the referred technical features. Thus, the features prefixed by "first" and "second" will explicitly or implicitly represent that one or more of the referred technical features are included. In the description of the present application, "multiple"/"a plurality of" refers to the number of two or more than two, except for clear and particular restriction.

In the description of the present application, it should be noted that, unless otherwise particularly stipulated or defined, terms "mounted", "connected", and "fixed" should be broadly interpreted as, for example, fixed connection, detachable connection, or permanent connection; mechanical connection or electrical connection; direct connected or indirect connection via media, or communication between inner parts of two elements or mutual action between two elements. For those skilled in the art, the specific meanings of the above terms in the present application may be understood based on specific situations.

Please refer to FIGS. 1-6, an integrated card swiping device provided by the present application is now described as follows. The integrated card swiping device comprises a casing 51, a circuit board 53, a magnetic head 56, a card reader 55, and a card support 54. The circuit board 53 is mounted inside the casing 51, the magnetic head 56 is used to read information of magnetic strip cards, the card reader 55 is used to read information of chip cards; the card support 54 is used to position the cards, and the cards can be the credit cards, bankcards, or member cards in the form of the magnetic strip card or the chip card. The card support 54 defines therein a card slot 541 for allowing the card to be inserted in, the card support 54 is mounted inside the casing 51, the magnetic head 56 is electrically connected with the circuit board 53, the card reader 55 is mounted on the card support 54, the magnetic head 56 is disposed on the card support 54, and a side of the casing 51 defines a first opening for allowing the card to be inserted into the card slot 541. By defining the card slot 541 on the card support 54, it is conducive for the insertion of the card into the card slot 541. By disposing the magnetic head 56 on the card support 54 and mounting the card reader 55 on the card support 54, when the chip card is inserted into the card slot 541, the information of the chip card can be read by the card reader 55; when the magnetic strip card is inserted into the card slot 541, the information of the magnetic strip card can be read by the magnetic head 56. Thus, the reading structure for the magnetic strip card and the reading structure for the chip card are integrated as a whole, which reduces the occupied space, and the integrated card swiping device 50 can be fabricated to be much smaller, moreover, in use, it is not necessary to distinguish whether the card is a magnetic strip card or a chip card, making the use convenient.

The integrated card swiping device provided by the present application, compared with the prior art, is convenient for the insertion of the card into the card slot 541 by defining the card slot 541 on the card support 54. By disposing the magnetic head 56 on the card support 54 and mounting the card reader 55 on the card support 54, when the chip card is inserted into the card slot 541, the information of the chip card can be read by the card reader 55; when the magnetic strip card is inserted into the card slot 541, the information of the magnetic strip card can be read by the magnetic head 56. Thus, the reading structure for the magnetic strip card and the reading structure for the chip card are integrated as a whole, which reduces the occupied space, and the integrated card swiping device 50 can be fabricated to be much smaller, moreover, in use, it is not necessary to distinguish whether the card is a magnetic strip card or a chip card, making the use convenient.

Figure 1:
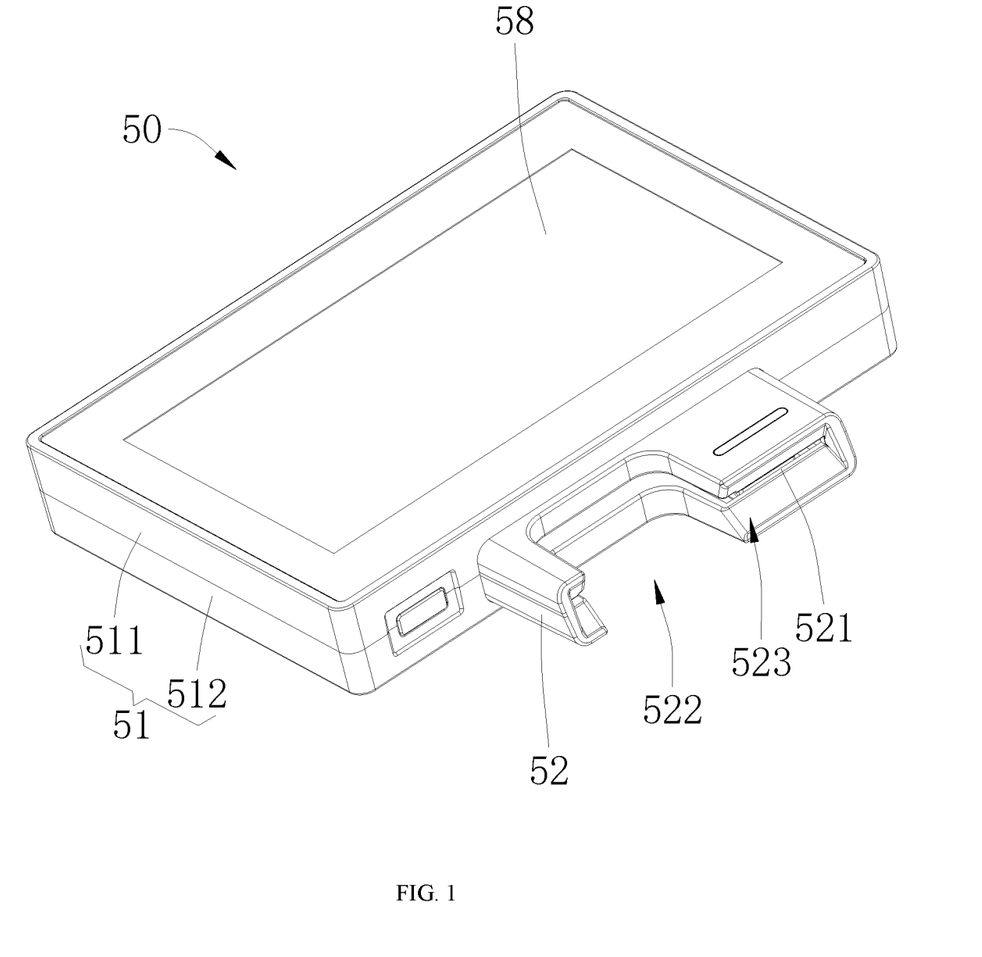
FIG. 1 is a first structural schematic view of an integrated card swiping device provided by one embodiment of the present application.
Figure 2:
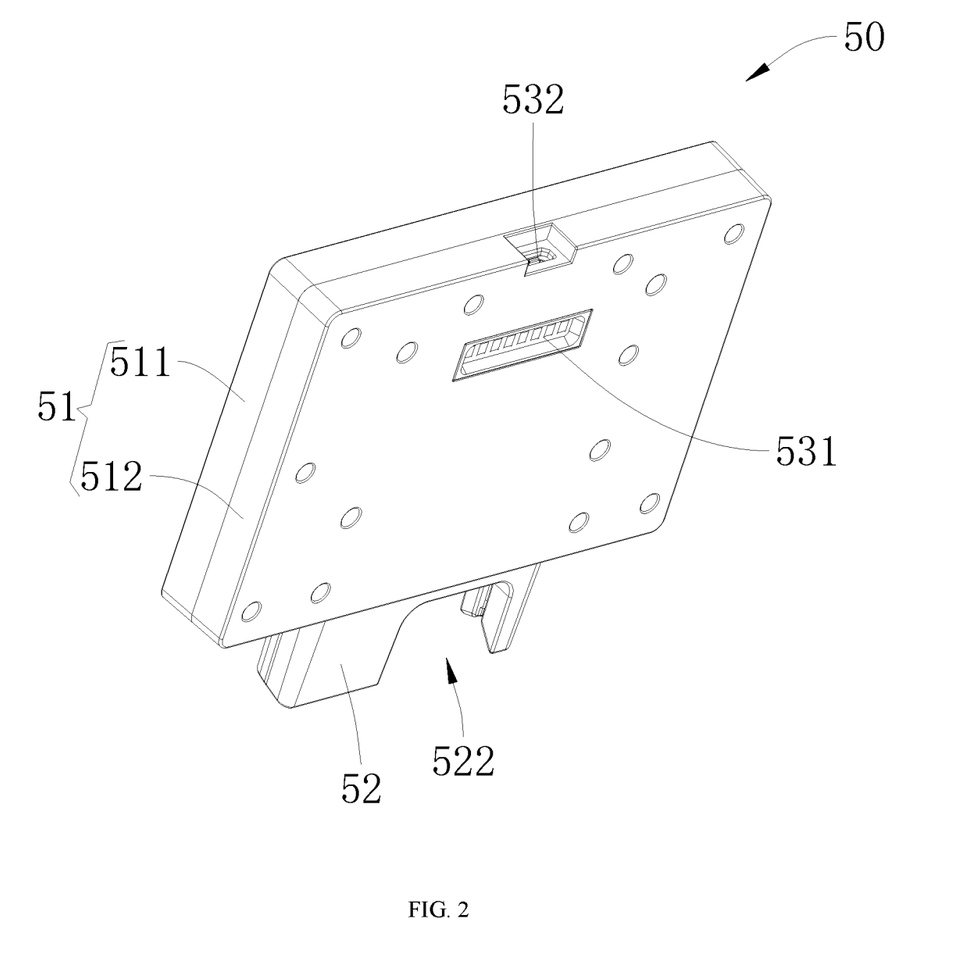
FIG. 2 is a second structural schematic view of the integrated card swiping device provided by one embodiment of the present application.
Figure 3:
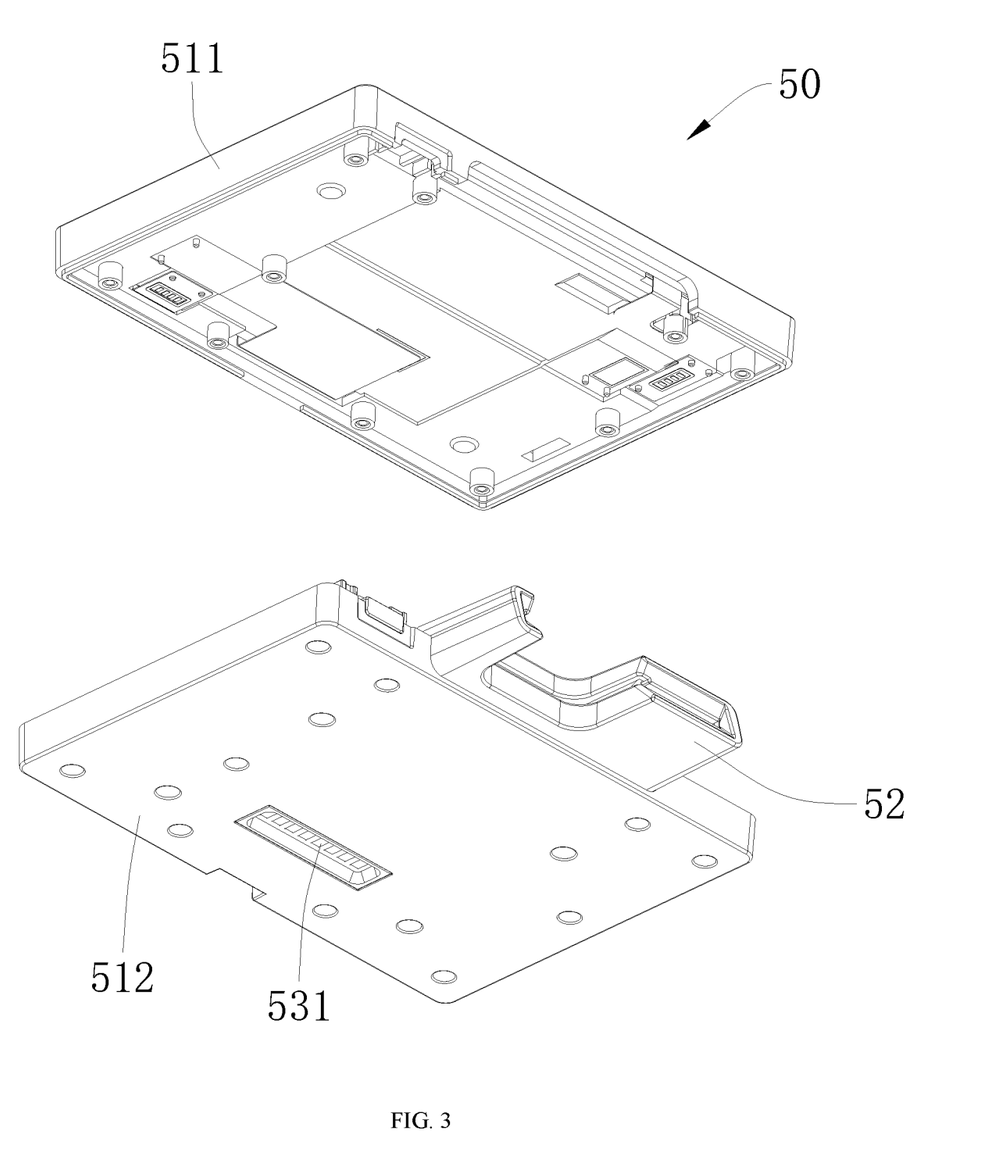
FIG. 3 is a first exploded structural schematic view of the integrated card swiping device provided by one embodiment of the present application.

Further, please refer to FIGS. 1 and 3, as one embodiment of the integrated card swiping device 50 provided by the present application, the integrated card swiping device further comprises a gold finger 531, the gold finger 531 is electrically connected with the circuit board 53, and a bottom of the casing 51 defines a second opening to expose the gold finger 531. The arrangement of the gold finger 531 enables a detachable connection between the integrated card swiping device and other servers or docking stations.

Figure 4:
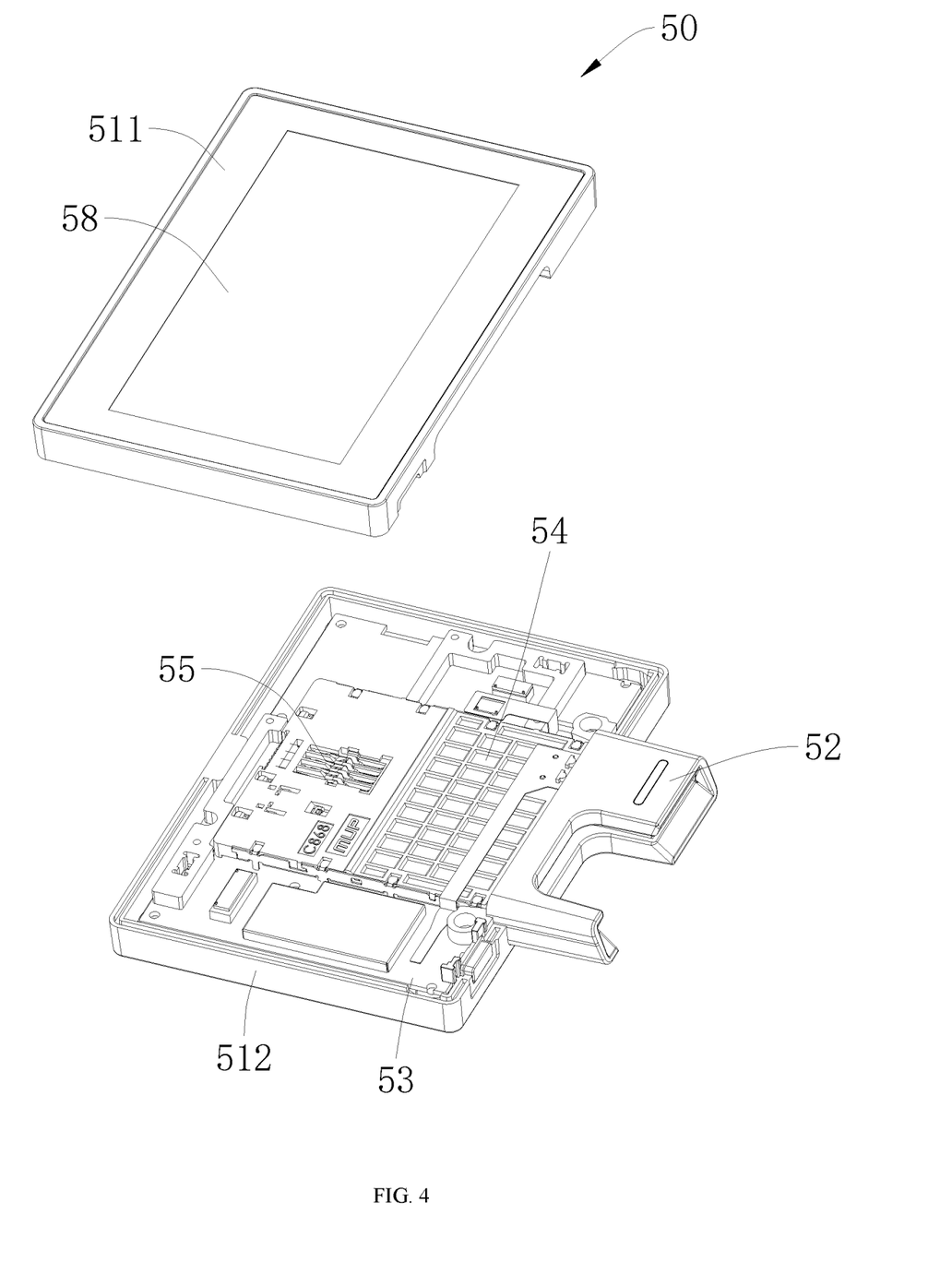
FIG. 4 is a second exploded structural schematic view of the integrated card swiping device provided by one embodiment of the present application.
Figure 5:
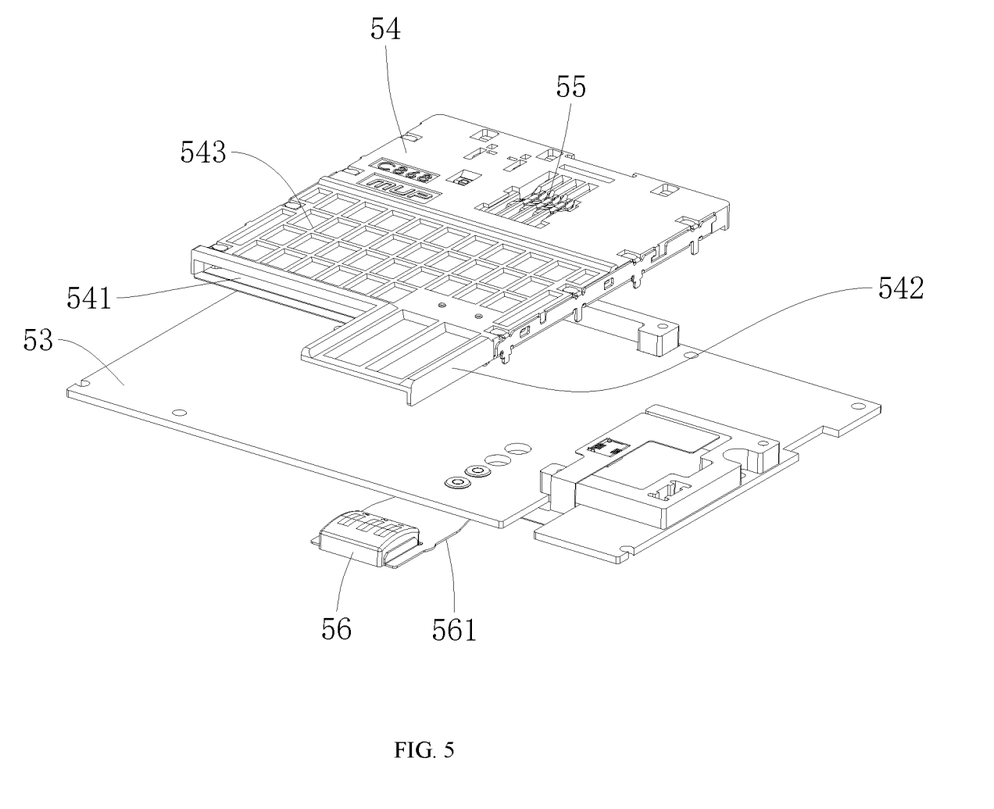
FIG. 5 is a first inner structural schematic view of the integrated card swiping device of FIG. 4.
Figure 6:
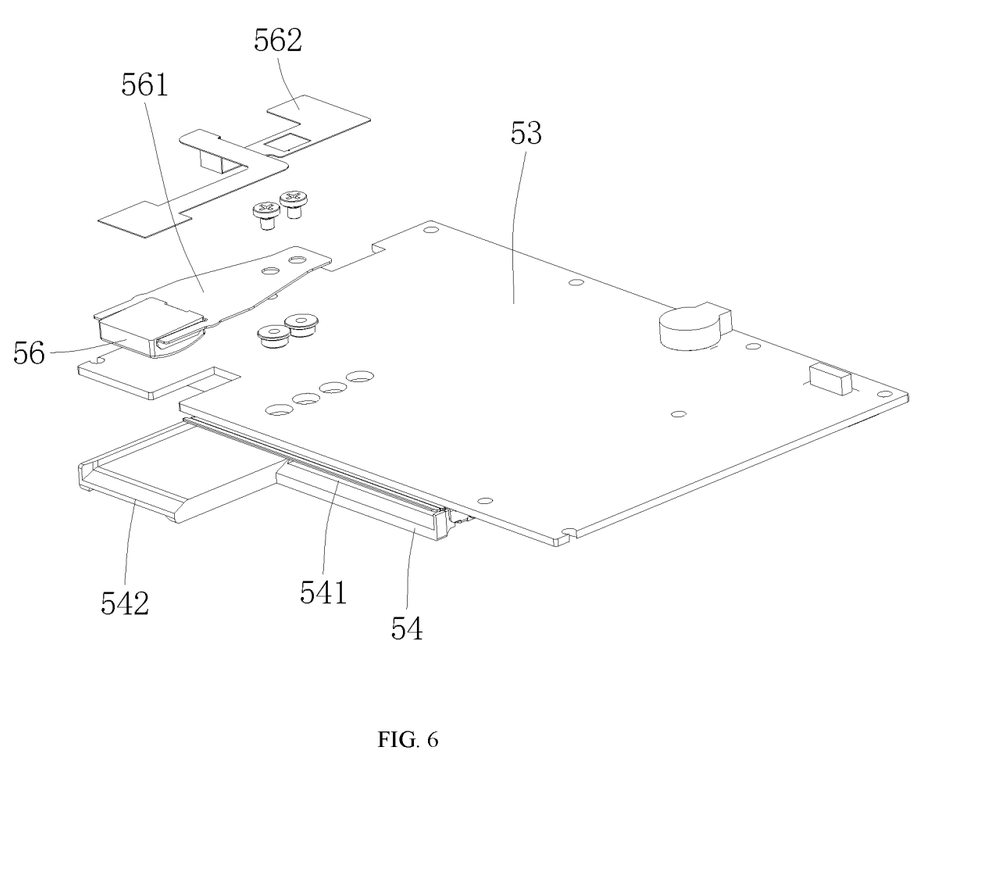
FIG. 6 is a second inner structural schematic view of the integrated card swiping device of FIG. 4.

Further, please refer to FIGS. 1, 4, and 6, as one embodiment of the integrated card swiping device 50 provided by the present application, the integrated card swiping device 50 further comprises a positioning head 52 for positioning the card. The positioning head 52 defines therein with a slit 521 for guiding and positioning the card, a rear end of the positioning head 52 is fixed in the first opening. The arrangement of the positioning head 52 can function in positioning when the card is inserted into the card slot 541 of the card support 54, thereby being convenient in use.

Further, as one embodiment of the integrated card swiping device 50 provided by the present application, the card support extends from a front section of the card slot 541 to form a support plate 542, and the magnetic head 56 is disposed on the support plate 542. Because it requires a relatively long stroke when reading the information of the magnetic strip card, while the support plate 542 is arranged on the card support 54, and the support plate 542 is disposed on the magnetic head 56, the card support 54 can be designed to be relatively small, and the casing 51 can therefore be designed to be relatively small, thus reducing the volume of the integrated card swiping device 50.

Further, as one embodiment of the integrated card swiping device 50 provided by the present application, the magnetic head 56 and the support plate 542 extend into the positioning head 52, and the magnetic head 56 is located at one side of the positioning head. Such a structure allows the magnetic head 56 and the support plate 542 to extend into the positioning head 52; as the positioning head 52 is mounted on the casing, the volume of the casing 51 can be further minimized, so that the integrated card swiping device 50 is fabricated to have a much smaller volume.

Further, as one embodiment of the integrated card swiping device 50 provided by the present application, the positioning head 52 defines a notch 522, and the notch 522 and the magnetic head 56 are respectively located at two sides of the positioning head 52. By arranging the notch 522 on the positioning head 52, it is convenient to insert a card into the positioning head 52; meanwhile, when the card is inserted into the card slot 541 of the card support 54, such a structure facilitates clamping the card at the notch 522 and thereby facilitate taking the card out.

Further, as one embodiment of the integrated card swiping device 50 provided by the present application, a front end of the positioning head 52 is provided with a guide slot 523 of which a width gradually reduces from the front to rear. Such a structure is conducive to insert the card into the slit 521 of the positioning head 52, and further guide the card into the card slot 541 of the card support 54.

Further, as one embodiment of the integrated card swiping device 50 provided by the present application, the integrated card swiping device 50 further comprises a resilient piece 561 for supporting the magnetic head 56, one end of the resilient piece 561 is fixed on the circuit board 53, and the magnetic head 56 is mounted on another end of the resilient piece. By using the resilient piece 561 to support the magnetic head 56, when the card being inserted, the magnetic head 56 can be better attached to the card so as to read the information of the magnetic strip card.

Further, as one embodiment of the integrated card swiping device 50 provided by the present application, the integrated card swiping device 50 further comprises a flexible circuit board 562 electrically connecting the magnetic head 56 with the circuit board 53. The use of the flexible circuit board 562 to connect with the magnetic head 56 and the circuit board 53 is conducive to the electrical connection of the magnetic head 56 and the circuit board 53, as well as the mounting and the layout of the magnetic head 56.

Further, as one embodiment of the integrated card swiping device 50 provided by the present application, the casing 51 comprises a bottom cover 512 and an upper cover 511 arranged onto the bottom cover 512, the card support 54 is mounted to the circuit board 53, and the circuit board 53 is fixed to the bottom cover 512. The casing 51 is formed by using the bottom cover 512 and the upper cover 511, thus being convenient to be processed and fabricated, meanwhile it is also convenient to mount the circuit board 53 and the card support 54. Moreover, by mounting the card support 54 on the circuit board 53 and fixing the circuit board 53 on the bottom cover 512, the casing 51 can be fabricated to have a relatively small thickness, thereby being convenient to be hold and used.

Further, as one embodiment of the integrated card swiping device 50 provided by the present application, the integrated card swiping device 50 further comprises a display screen 58, the display screen 58 is mounted on a top surface of the casing 51, and the display screen 58 is electrically connected with the circuit board 53. The arrangement of the display screen 58 on the casing 51 is conducive to display of the consumption information when swiping the card.

Further, the display screen 58 is a touch screen. Thus, when the integrated card swiping device 50 is used for swiping card for consumption, it enables users to sign their names and input the consumption information.

Further, the top portion of the casing 51 defines an concave accommodation portion (not shown in the figures) configured to match with and mount the display screen 58. The arrangement of the concave accommodation portion is conducive to the mounting of the display screen 58, and at the same time can provide the function of protecting lateral sides of the display screen 58.

Further, as one embodiment of the integrated card swiping device 50 provided by the present application, the integrated card swiping device 50 further comprises a wireless module (not shown in the figures) for wireless communication, and the wireless module is electrically connected with the circuit board 53. By arranging the wireless module, it is convenient to communicate when swiping the card.

Further, as one embodiment of the integrated card swiping device 50 provided by the present application, the card support 54 is provided thereon with a plurality of ribs 543. By arranging the ribs 543 on the card support 54, the strength of the card support 54 can be enhanced.

Further, as one embodiment of the integrated card swiping device 50 provided by the present application, the integrated card swiping device 50 further comprises a data interface 532 that is electrically connected with the circuit board, a rear end of the casing 51 defines a third opening (not shown in the figures), the data interface 532 is mounted in a position corresponding to the third opening. By arranging the data interface 532, it is convenient for the integrated card swiping device 50 to establish data communication with other electronic devices.

The aforementioned embodiments are only preferred embodiments of the present application, and are not intended to limit the present application. Any modification, equivalent replacement, improvement, and so on, which are made within the spirit and the principle of the present application, should be included in the protection scope of the present application.

What is claimed is:

1. An integrated card swiping device, comprising a casing, a circuit board mounted inside the housing, a magnetic head configured to read a magnetic strip card, a card reader configured to read a chip card, a card support for positioning a card, and a gold finger in electrical connection with the circuit board; wherein the card support defines therein a card slot for allowing the card to be inserted in, the card support is mounted inside the casing, the magnetic head is electrically connected with the circuit board, the card reader is mounted on the card support, the magnetic head is disposed on the card support, and a side of the casing defines a first opening for allowing the card to be inserted into the card slot; the card support extends from a front section of the card slot to form a support plate, and the magnetic head is disposed on the support plate; and a bottom of the casing defines a second opening to expose the gold finger.

2. The device of claim 1, further comprising a positioning head for positioning the card, wherein the positioning head defines therein a slit for guiding and positioning the card, and a rear end of the positioning head is fixed in the first opening.

3. The device of claim 2, wherein the magnetic head and the support plate extend into the positioning head, and the magnetic head is located at one side of the positioning head.

4. The device of claim 3, wherein the positioning head defines a notch, and the notch and the magnetic head are respectively located at both sides of the positioning head.

5. The device of claim 1, further comprising a resilient piece for supporting the magnetic head, one end of the resilient piece is fixed on the circuit board, and the magnetic head is mounted on the other end of the resilient piece.

6. The device of claim 5, further comprising a flexible circuit board electrically connecting the magnetic head with the circuit board.

7. The device of claim 1, wherein the casing comprises a bottom cover and an upper cover arranged onto the bottom cover, the card support is mounted to the circuit board, and the circuit board is fixed to the bottom cover.

8. The device of claim 1, further comprising a display screen, and the display screen is mounted on a top side of the casing.

9. The device of claim 1, further comprising a wireless module for wireless communication, and the wireless module is electrically connected with the circuit board.

10. The device of claim 4, further comprising a resilient piece for supporting the magnetic head, one end of the resilient piece is fixed on the circuit board, and the magnetic head is mounted on the other end of the resilient piece.

11. The device of claim 10, further comprising a flexible circuit board electrically connecting the magnetic head with the circuit board.

12. The device of claim 4, wherein the casing comprises a bottom cover and an upper cover arranged onto the bottom cover, the card support is mounted to the circuit board, and the circuit board is fixed to the bottom cover.

13. The device of claim 4, further comprising a display screen, and the display screen is mounted on a top side of the casing.

14. The device of claim 4, further comprising a wireless module for wireless communication, and the wireless module is electrically connected with the circuit board.

15. The device of claim 1, wherein a front end of the positioning head is provided with a guide slot with a width thereof gradually reducing from the front to the rear.

16. The device of claim 1, further comprising a data interface in electrical connection with the circuit board, a rear end of the casing defines a third opening, and the data interface is mounted in a position corresponding to the third opening.

17. The device of claim 1, wherein the card support is provided thereon with a plurality of ribs.

* * * * *